United States Patent [19]

Tanaka et al.

[11] Patent Number: 4,550,143

[45] Date of Patent: Oct. 29, 1985

[54] COMPOSITION COMPRISING ETHYLENE-BASED POLYMERS

[75] Inventors: Kenji Tanaka; Akinobu Sugawara; Takashi Yamawaki, all of Ichihara, Japan

[73] Assignee: Idemitsu Petrochemical Co., Ltd., Tokyo, Japan

[21] Appl. No.: 616,601

[22] Filed: Jun. 1, 1984

[30] Foreign Application Priority Data

Jun. 10, 1983 [JP] Japan .................................. 58-102856
Jun. 16, 1983 [JP] Japan .................................. 58-106781

[51] Int. Cl.$^4$ ...................... C08L 23/06; C08L 23/16; C08L 23/20
[52] U.S. Cl. .................................. 525/240; 526/348; 526/348.2; 526/348.6
[58] Field of Search ......................................... 525/240

[56] References Cited

U.S. PATENT DOCUMENTS

| | | | |
|---|---|---|---|
| 3,280,220 | 10/1966 | Nelson | 525/240 |
| 4,230,831 | 10/1980 | Sakurai et al. | 525/240 |
| 4,390,666 | 6/1983 | Moriguchi et al. | 525/240 |
| 4,414,369 | 11/1983 | Kuroda et al. | 526/65 |
| 4,461,873 | 7/1984 | Bailey et al. | 525/240 |

*Primary Examiner*—Carman J. Seccuro
*Attorney, Agent, or Firm*—Frishauf, Holtz, Goodman & Woodward

[57] ABSTRACT

The invention provides a novel resin composition of polymers of ethylene capable of giving a shaped article having outstandingly excellent mechanical properties but yet having very good processability or moldability. The resin composition is composed of 15–90% by weight of a homopolymer of ethylene and 85–10% by weight of a copolymer of ethylene and characterized by several parameters including the intrinsic viscosity, density and swelling ratio as well as satisfaction of the relationships between the melt index and the intrinsic viscosity and between the melt index and the melt tension expressed by the respective logarithmic equations. Industrially feasible processes for the preparation of such resin compositions are described in detail.

5 Claims, No Drawings

COMPOSITION COMPRISING ETHYLENE-BASED POLYMERS

BACKGROUND OF THE INVENION

The present invention relates to a resin composition comprising ethylene-based polymers or, more particularly, to a resin composition comprising ethylene-based polymers with excellent moldability and capable of giving shaped articles having excellent mechanical properties.

As well known, high-density polyethylenes are unusually prepared by the polymerization using a Ziegler catalyst and the molecular weight of the current products of high-density polyethylene is relatively high as a trend in consideration of the improved mechanical strength of the articles shaped of the polyethylene resin. A problem encountered in the molding works of high-density polyethylene resins having such a high molecular weight is the workability of the resin and, when the polyethylene resin has a narrow molecular weight distribution, the resin is poorly flowable to cause a great decrease in the productivity of the plastic fabrication along with an increase in the power consumption due to the higher pressure on the molten resin under fabrication.

In order to solve the above mentioned problem, several attempts have been made to manufacture a high-density polyethylene resin excellent in the moldability and the mechanical properties of the shaped articles by the methods of melt-blending, multistage polymerization and the like. Unfortunately, none of the attempts has been quite successful in producing a polyethylene resin having moldability suitable for blow molding and inflation molding.

SUMMARY OF THE INVENTION

An object of the present invention is therefor to provide a resin composition comprising ethylene-based polymers and having a good balance between the moldability of the resin composition and the physical properties of the shaped articles thereof freed from the above described problems in the prior art resin compositions.

Thus, the resin composition of the present invention comprises:

(a) from 15 to 90 parts by weight of a homopolymer of ethylene; and
(b) from 85 to 10 parts by weight of a copolymer of ethylene and, preferably, an α-olefin having from 3 to 10 carbon atoms in a molecule, and is characterized by the parameters of:

(i) an intrinsic viscosity $[\eta]$ in the range from 2.0 to 5.2 dl/g;
(ii) a density in the range from 0.938 to 0.970 g/cm$^3$;
(iii) a swelling ratio of at least 1.30; and
(iv) a melt index (MI) satisfying the relationships of $\log MI \geq 0.81 - 0.69 [\eta]$ and $\log MT \geq 1 - 0.33 \log MI$, wherein MT being the melt tension.

DETAILED DESCRIPTION OF THE PREFERRED EMBODIMENTS

As is mentioned above, the polymeric constituent of the inventive resin composition includes two types of the ethylene-based polymers of the components (a) and (b). The component (a) is a homopolymer of ethylene which may be any one of conventional ones but it is preferable that the component (a) is a combination of a homopolymeric polyethylene resin having an intrinsic viscosity $[\eta]$ in the range from 12 to 25 and another homopolymeric polyethylene resin having an intrinsic viscosity $[\eta]$ in the range from 0.2 to 1.5. The weight proportion of the former polyethylene resin to the latter should be 1:1 to 10 or preferably, 1:2 to 7.

The component (b) combined with the component (a) above described is a copolymer of ethylene which may be any one of conventional copolymers of ethylene. It is preferable that the copolymer of ethylene as the component (b) is a copolymer of ethylene and an α-olefin having from 3 to 10 or, more preferably, from 3 to 6 carbon atoms in a molecule. Exemplary of such an α-olefin are propylene, butene-1, hexene-1, octene-1 and the like.

The amounts of the components (a) and (b) in the inventive resin composition should be in the range from 15 to 90% by weight or, preferably, from 40 to 70% by weight of the former and from 85 to 10% by weight or, preferably, from 60 to 30% by weight of the latter based on the total amount of these two types of resins. The above mentioned weight ratio of the resins is essential in order to obtain satisfactory physical properties of the articles shaped of the resin composition. For example, the stiffness of the shaped article is decreased when the amount of the component (a) is less than 15% by weight while an amount of the component (a) in excess of 90% by weight is undesirable because of the poor enviromental stress cracking resistance (ESCR).

In addition to the above described limitation in the formulation of the resin components, the resin composition of the present invention should satisfy following requirements.

(i) The intrinsic viscosity $[\eta]$ thereof should be in the range from 2.0 to 5.2 dl/g or, preferably, from 2.2 to 4.5 dl/g as measured at 135° C. with tetrahydronaphthalene as the solvent. When the value of the intrinsic viscosity is not within the above range, the moldability of the resin composition is extremely poor.

(ii) The density thereof should be in the range from 0.938 to 0.970 g/cm$^3$ or, preferably, from 0.940 to 0.960 g/cm$^3$. Shaped articles of the resin composition having a density smaller than 0.938 g/cm$^3$ has poor stiffness.

(iii) The swelling ratio should be at least 1.30 or, preferably, at least 1.35 at a shearing velocity of 10.3 sec$^{-1}$. When the swelling ratio is smaller than 1.30, no satisfactory pinch-off characteristic can be obtained in the blow-molded article. Further, it is a desirable condition that the ratio of the swelling ratio at a shearing velocity 103 sec$^{-1}$ ($S_{103}$) to the swelling ratio at a shearing velocity 10.3 sec$^{-1}$ ($S_{10.3}$), i.e. $S_{103}/S_{10.3}$, is 1.18 or smaller or, preferably, 1.15 or smaller. This is because a resin composition of which the value is larger than 1.18 may decrease the molding adaptability of a metal mold necessitating replacement of the die resulting in decreased productivity of the molding process.

(iv) The intrinsic viscosity $[\eta]$ and the melt index MI should satisfy the relationship expressed by the equation $\log MI \geq 0.81 - 0.69 [\eta]$. When this relationship is not satisfied, the extrusion rate of the resin composition cannot be sufficiently high in the molding procedure resulting in decreased productivity along with an increase in the power consumption due to the increase in the pressure on the molten resin composition.

(v) The melt index MI and the melt tension MT should satisfy the relationship expressed by the equation $\log MT \geq 1 - 0.33 \log MI$. When a resin composition not satisfying this relationship is molded, break some-times takes place in the parison and the weld strength of the pinchoff portion is decreased along with a decrease of the bubble stability in the inflation molding.

The resin composition of the present invention comprising the ethylene-based polymers can be prepared in a variety of ways. For example, the homopolymeric polyethylene resin and the copolymer of ethylene can be prepared by the methods of multistage polymerization, melt blending and a combination thereof. A preferable way is the method of multistage polymerization or melt blending for the preparation of a resin composition of the ethylene-based polymers composed of from 5 to 23% by weight of a homopolymeric polyethylene (a) having an intrinsic viscosity in the range from 11 to 26 dl/g, another homopolymeric polyethylene (b) having an intrinsic viscosity in the range from 0.2 to 1.6 dl/g and a copolymer of ethylene (c) having an intrinsic viscosity in the range from 1.5 to 5.1 dl/g, in which the ratio of the amount of the homopolymer (b) to the copolymer (c) is in the range from 1:0.5 to 1:1.5.

A more preferable way capable of giving still better results is a method of three-step polymerization for the homopolymer or copolymer of ethylene by use of a binary catalyst composed of (A) a solid catalyst component comprising titanium, magnesium and a halogen and (B) a catalyst component mainly composed of an organoaluminum compound, in which the first step is performed by the sequence of three partial steps including:

(a) a first partial step in which polymerization is performed to produce from 5 to 23% by weight, based on the overall amount of polymerization, of a homopolymer of ethylene having an intrinsic viscosity in the range from 11 to 26 dl/g at a temperature in the range from 50° to 80° C.;

(b) a second partial step in which the polymerization is continued at a temperature in the range from 70° to 100° C. to produce an ethylene homopolymer having an intrinsic viscosity in the range from 0.2 to 1.6 dl/g; and (c) a third partial step in which the polymerization is further continued at a temperature in the range from 60° to 90° C. to produce a copolymer of ethylene having an intrinsic viscosity in the range from 2.9 to 5.1 dl/g and containing from 2 to 30% by weight of the α-olefin as the comonomer, the sequential order of the partial steps (b) and (c) being reversible according to need, in which the extents of polymerization in the partial steps (b) and (c) should be controlled such that the ratio of the amount of the polymer produced in the partial step (b) to that in the partial step (c) is in the range from 1:0.5 to 1:1.5.

The polymerization catalyst used in the above described method includes (A) a solid catalyst component comprising titanium, magnesium and a halogen as the essential constituents and (B) a catalyst mainly composed of an organoaluminum compound. The solid catalyst component as the component (A) is a composite solid formed by successively or primarily bringing a magnesium compound into contact with a halogen-containing titanium compound or an addition compound thereof with an electron donor and various kinds of known ones can be used for the purpose without particular limitations. Such a composite solid can be prepared, for example, by reacting a magnesium compound with a chlorine-containing titanium compound in a hydrocarbon solvent under agitation.

The magnesium compound usable in the preparation of the component (A) above includes various kinds of the compounds usually used as a carrier of the Ziegler catalysts. Exemplary of such a magnesium compound are magnesium halides such as magnesium chloride, magnesium bromide, magnesium iodide and magnesium fluoride, magnesium hydroxide, magnesium oxide, magnesium sulfate, magnesium carbonates, hydroxymagnesium halides such as hydroxymagnesium chloride, hydroxymagnesium bromide and hydroxymagnesium iodide; magnesium alkoxides such as magnesium methoxide, magnesium ethoxide, magnesium propoxide and magnesium butoxide; alkoxymagnesium halides such as methoxymagnesium chloride, methoxymagnesium bromide, ethoxymagnesium chloride, ethoxymagnesium bromide, propoxymagnesium chloride, propoxymagnesium bromide, butoxymagnesium chloride and butoxymagnesium bromide, allyloxymagnesium, allyloxymagnesium halides such as allyloxymagnesium chloride and allyloxymagnesium bromide and alkylmagnesium halides such as methylmagnesium chloride, methylmagnesium bromide, ethylmagnesium chloride, ethylmagnesium bromide, propylmagnesium chloride, propylmagnesium bromide, butylmagnesium chloride and butylmagnesium bromide as well as mixtures thereof.

Although the above named magnesium compounds can be used as such, it is preferable to use a magnesium compound modified with a halide of silicon and the like. A preferable example of such a modified magnesium compound is that disclosed in Japanese Patent Kokai No. 55-40724 according to which a mixture of a magnesium dialkoxide and magnesium sulfate is modified with silicon tetrachloride and an alcohol.

The halogen-containing titanium compound used for the preparation of the component (A) in combination with the above mentioned magnesium compound may be any one of the compounds of divalent, trivalent or tetravalent titanium. The halogen in the halogen-containing titanium compound can be chlorine, bromine or iodine, of which chlorine is preferred. Particular examples of the halogen-containing titanium compound include titanium tetrachloride $TiCl_4$, titanium trichloride $TiCl_3$, an adduct of titanium trichloride and aluminum chloride $TiCl_3 1/3 AlCl_3$, methoxytitanium dichloride $CH_3OTiCl_2$, ethoxytitanium trichloride $C_2H_5OTiCl_3$, propoxytitanium trichloride $C_3H_7OTiCl_3$, dipropoxytitanium dichloride $(C_3H_7O)_2TiCl_2$, diethoxytitanium dichloride $(C_2H_5O)_2TiCl_2$, triethoxytitanium chloride $(C_2H_5O)_3TiCl$ and the like. It is preferable that the solid catalyst component as the component (A) is prepared by combining the magnesium compound and the halogen-containing titanium compound in such a proportion that the molar ratios of halogen/titanium and magnesium/titanium are in the ranges of from 3 to 200 and from 5 to 90, respectively.

The organoaluminum compound as the component (B) is a compound having at least one aluminum-to-carbon linkage in a molecule such as those belonging to the classes of $R_3Al$, $R_2AlX$, $RAlX_2$, $R_2AlOR$, $RAl(OR)X$, $R_3Al_2X_3$ and the like, in which R is an alkyl or aryl group having 1 to 20 carbon atoms while the groups denoted by R in a molecule may be the same ones or different ones when the compound has two or more groups R in a molecule and X is a halogen atom. Exemplary of the particularly preferable organoaluminum compound are diethylaluminum monochloride, diisopropylaluminum monochloride, diisobutylaluminum monochloride, dioctylaluminum monochloride, ethylaluminum dichloride, isopropylaluminum dichloride, ethylaluminum sesquichloride and the like. The organoaluminum compound as the component (B) should be used in an amount by moles of 0.1 to 1000 times of the titanium compound in the component (A).

The catalyst mainly composed of the above described components (A) and (B) usually has a capacity to produce 80 to 400 grams of a polymer of ethylene per milligram of the titanium contained therein.

Among the catalysts of the above described type, particularly suitable for the purpose of the present invention are those described in Japanese Patent Kokai Nos. 54-161691, 55-40724 and 55-149307.

The method for the preparation of the inventive resin composition is performed by the three-step polymerization of ethylene by use of the above described catalyst.

The first step is the above described step (a) which should be performed under a temperature condition of 50° to 80° C. The polymerization reaction cannot proceed to a sufficient extent when the temperature is below 50° C. with resultant low productivity while a reaction temperature higher than 80° C. is undesirable due to the difficulty in controlling the intrinsic viscosity of the polymer obtained by the reaction so that no satisfactory properties cannot be imparted to the homopolymer of ethylene. Furthermore, the reaction in this step (a) is performed under such conditions suitably selected that the homopolymer of ethylene prepared by the reaction may have an intrinsic viscosity $[\eta]$ in the range from 11 to 26 dl/g or, preferably, from 12 to 24 dl/g. These requirements for the intrinsic viscosity can be satisfied by suitably selecting, in addition to the above mentioned temperature condition, the pressure, feed rates of ethylene and hydrogen and other parameters. In particular, the intrinsic viscosity can readily be controlled within the above given preferable range by use of a molecular weight controlling agent such as hydrogen. When the intrinsic viscosity of the homopolymer of ethylene produced in this stage is smaller than 11 dl/g, on the other hand, the ethylene-based polymer finally obtained may have an unduly small swelling ratio so that the polymer is no longer suitable for blow molding while the polymer should not have an intrinsic viscosity larger than 26 dl/g due to the difficulty encountered in the continuous operation along with the sharkskin-like appearance of the finally shaped article with no practical value.

In addition, the polymerization reaction in this step (a) should be controlled and terminated in such a manner that the amount of the polymer produced in this step is in the range from 5 to 23% by weight or, preferably, from 8 to 20% by weight or, more preferably, from 10 to 17% by weight of the total amount of the polymer produced in the three steps (a), (b) and (c). This condition can be achieved by adequately selecting the polymerization time in accordance with the conditions of the polymerization reaction. When this amount of the polymer is smaller than 5% by weight, the homopolymer or copolymer of ethylene finally obtained may have an unduly small swelling ratio along with decreased miscibility or compatibility between the homopolymers or copolymers produced in the individual steps and difficulties are encountered in the continuous operation of the process due to the decreased bulk density of the polymer. The amount of the polymer produced in this step larger than 23% by weight is also undesirable because of the poor moldability of the polymer finally obtained.

After completion of the above described step (a), the steps (b) and (c) are undertaken, the sequential order of these two steps being reversible. That is, the three steps of (a), (b) and (c) of the polymerization are carried out in the sequential order of either (a), (b) and (c) or (a), (c) and (b). The polymerization reaction in this step (b) is performed under a temperature condition of 70° to 100° C. or, preferably, 75° to 95° C. as is mentioned before. When the temperature in this step (b) is lower than 70° C., the polymerization reaction cannot proceed sufficiently so that the productivity is decreased. When the temperature in this case exceeds 100° C., on the other hand, the polymer already produced is partly melted and clotted so that great difficulties are encountered in the continuous operation. In addition to the above mentioned condition of temperature, the polymerization reaction in this step (b) should be controlled so as to produce a homopolymer of ethylene having specified properties. That is, the conditions of the polymerization reaction in this step should be selected in such a manner that the produced polymer has an intrinsic viscosity in the range from 0.2 to 1.6 dl/g or, preferably, from 0.3 to 1.4 dl/g. The soluble fraction of the homopolymer of ethylene also increases when the intrinsic viscosity of the polymer is smaller than 0.2 dl/g. An intrinsic viscosity of the polymer larger than 1.6 dl/g is, on the other hand, undesirable from the practical standpoint due to the decrease in the flowability and ESCR of the homopolymer of ethylene. It should be noted here that the above described requirements are limitatively relative to the properties of the homopolymer of ethylene produced by carrying out the polymerization with supply of the unreacted ethylene monomer to the step (b) and are not relative to the properties of the homopolymer of ethylene produced by the introduction of a mixture containing the polymer, i.e. a mixture of the monomers, oligomers, homopolymers, after the polymerization reaction proceeded to some extent through the step (a) and, further, step (c). The same remarks are held also for the step (c). Therefore, the conditions in this step (b) can easily and independently selected without being affected by the conditions and the properties of the produced polymer in the step (a). In other words, furthermore, the conditions of the polymerization in the step (b) or step (c) are selected with reference to the properties of the homopolymer produced from the monomers as the starting material and not to define the properties of the homopolymer actually obtained after the step (b) or step (c). Therefore, the conditions of the step (b) can be selected in advance independently from the properties of the polymer produced in the step (a) or in the step (c).

In a similar manner to the selection of the conditions in the step (a), the conditions in this step (b) can readily be established by adequately selecting the parameters such as the reaction pressure, feed rate of ethylene, feed rate of hydrogen and others.

In the next place, the polymerization in the step (c) is performed under the condition of temperature in the range from 60° to 90° C. or, preferably, from 65° to 85° C. When the temperature in this step (c) is lower than 60° C., the polymerization velocity is low not to ensure a sufficiently high productivity while difficulties are encountered in the continuous operation at a temperature higher than 90° C. due to the partial melting of the polymer to form lumps. Further, the conditions of this step (c) should be selected in such a manner that the homopolymer or copolymer of ethylene formed in the step contains the α-olefin other than ethylene in a content of 2 to 15% by weight or, preferably, 4 to 10% by weight and the intrinsic viscosity thereof [η] is in the range from 2.9 to 5.1 dl/g or, preferably, from 3.1 to 4.7 dl/g. Such conditions of the step (c) can be established, similarly to the steps (a) and (b), by adequately selecting the parameters such as the reaction pressure, feed rate of ethylene, feed rate of the α-olefin other than ethylene, feed rate of hydrogen and others. Further, similarly to the steps (a) and (b), the conditions in this step (c) should be selected on the base of the properties of the copolymer formed from the monomers of ethylene and other α-olefins and not on the base of the properties of the homopolymer or copolymer per se actually produced in the step (c) starting from the mixture containing the polymers after the step (a) and further the step (b).

As to the requirements for the copolymer of ethylene to be produced in the above described step (c), the content of other α-olefins such as propylene, butene-1, pentene-1, hexene-1 and the like should preferably be in the range from 2 to 30% by weight since the finally obtained polymer containing less than 2% by weight of the α-olefins may have a decreased ESCR while the finally obtained polymer containing more than 30% by weight of other α-olefins may have a decreased stiffness. Further, the homopolymer or copolymer of ethylene as the product may have a decreased ESCR when the conditions in this step lead to an intrinsic viscosity [η] smaller than 1.5 dl/g while the polymer may have a decreased flowability with poor practical value when the conditions in this step lead to an intrinsic viscosity larger than 5.1 dl/g.

It is optional in the above described method that either the step (b) preceeds the step (c) or vice versa. At any rate, the polymerization in these steps should be performed under control in such a manner that the ratio between the amounts of the polymers formed in the step (b) and in the step (c) is in the range from 1:0.5 to 1:1.5 or, preferably, in the range from 1:0.6 to 1:1.3. A ratio of polymerization outside this range is undesirable because the polymers formed in the steps (b) and (c) have poor compatibility along with an undue increase in the resin pressure.

The type of polymerization in each of the steps of the above described method is not particularly limitative including suspension polymerization, solution polymerization, gas-phase polymerization and the like carried out either batch-wise or as a continuous process. For example, the three-step suspension polymerization can be performed by use of an inert solvent such as pentane, n-hexane, cyclohexane, heptane, benzene, toluene and the like.

The composition of the polymer of ethylene according to the present invention has a sufficiently large melt tension of at least 30 grams along with good moldability. For example, break of the parison in the blow molding does not take place over a long time and the swelling ratio is little dependent on the shearing velocity so that the composition is very versatile characteristically in respect of the conditions for blow molding. The composition also exhibits excellent bubble stability in the inflation molding capable of giving films having good appearance.

Furthermore, the composition of the polymer of ethylene according to the present invention is excellent in the mechanical strengths such as stiffness and the like with an Olsen stiffness of at least 7000 kg/cm$^2$. The composition is excellent with an ESCR of at least 200 hours and contains only 5% or smaller of the constituents soluble in organic solvents.

Therefore, the composition of the polymer of ethylene according to the present invention is very useful as a base material of various shaped articles such as films, containers and the like and particularly suitable for blow molding of large articles. When the resin composition of the present invention is prepared by the most preferable method as described above, in addition, an additional advantage is obtained in the process that no degassing vessel is required since the polymerization proceeds under a condition of a decreased supply of hydrogen in the step (a) as the first-step polymerization.

In the following, the present invention is described in more detail by way of examples.

EXAMPLES 1 and 2 and COMPARATIVE EXAMPLES 1 to 5

(1) Preparation of the solid catalyst

In 50 ml of n-heptane were suspended 1.0 gram (g) (8.8 m moles) of magnesium diethoxide and 1.06 g (8.8 m moles) of anhydrous magnesium sulfate purchased on the market and were further added 1.5 g (8.8 m moles) of silicon tetrachloride and 1.6 g (35.2 m moles) of ethyl alcohol and the reaction was carried out at 80° C. for 1 hour. Thereafter, 5 ml (45 m moles) of titanium tetrachloride were added thereto and the reaction was continued at 98° C. for additional 3 hours. After completion of the reaction, the reaction mixture was cooled and kept standing and the supernatant liquid was discarded by decantation followed by three times of washing of the solid by the addition of 100 ml of fresh n-heptane, agitation and standing of the mixture and discarding of the supernatant liquid and finally a dispersion was obtained by the addition of 200 ml of n-heptane to the solid catalyst. The content of titanium supported on the solid was determined colorimetrically to give a result of 42 mg Ti/g carrier.

(2) Preparation of a composition of the copolymer of ethylene

Into a stainless steel-made autoclave were introduced, after replacement of the air inside with dry nitrogen, 500 milliliters (ml) of dehydrated hexane, 0.08 milli mole (m mole) of the solid catalyst prepared as described in (1) above containing 0.21 m mole of triethyl aluminum and 0.59 m mole of diethylaluminum chloride.

In the next place, the autoclave was continuously fed with hydrogen at a rate calculated to give the resultant homopolymer of ethylene an intrinsic viscosity [η]$_1$ shown in Table 1 and ethylene to give a total pressure of 8.7 kg/cm$^2$G inside the reaction vessel to perform the reaction for 25 minutes at 70° C.

Thereafter, the reaction in the second step was performed at 90° C. for 120 minutes so as to obtain a homopolymer of ethylene having an intrinsic viscosity [η]$_2$ as shown in Table 1. Further, the reaction was continued for 30 minutes at 80° C. by the addition of ethylene and propylene so that the copolymer of ethylene had an intrinsic viscosity [η] as shown in Table 1 with supply of hydrogen.

After completion of the reaction, the composition of the polymer of ethylene was washed, dried and subjected to the measurements of the physical properties to give the results shown in Table 2.

EXAMPLES 3 and 4

The same process of the three-step polymerization as in Example 1 was undertaken excepting the use of a solid catalyst prepared from magnesium diethoxide, silicon tetrachloride, isopropyl alcohol and titanium tetrachloride according to the example of preparation described in Japanese Patent Kokai No. 55-149307. In Example 4, butene-1 was used in place of the propylene in Example 1. The characterization of the compositions of the polymer of ethylene obtained in this manner is shown in Table 1 and the physical properties thereof are shown in Table 2.

COMPARATIVE EXAMPLE 6

The procedure of the polymerization was substantially the same as in Example 1 for the preparation of a composition of the polymer of ethylene except that the intrinsic viscosities $[\eta]$ of the homopolymer of ethylene produced in the first step, the copolymer of ethylene produced in the second step and the homopolymer of ethylene produced in the third step were 0.6, 4.04 and 20.7, respectively. The characterization of the composition and the physical properties thereof were as shown in Tables 1 and 2, respectively.

EXAMPLE 5

A composition of the polymer of ethylene as shown in Table 1 was prepared by the three-step polymerization in a similar manner to Example 1. The physical properties of this composition are shown in Table 2.

COMPARATIVE EXAMPLE 7

A composition of the polymer of ethylene was prepared in the same manner as in Example 1 except that the polymerization process was performed in a two-step polymerization method. The physical properties of this composition are shown in Table 2.

EXAMPLES 6 to 10 and COMPARATIVE EXAMPLES 8 to 17

(1) Preparation of the solid catalyst

In 50 ml of n-heptane were suspended 1.0 g (8.8 m moles) of magnesium diethoxide and 1.06 g (8.8 m moles) of anhydrous magnesium sulfate purchased on the market and were further added 1.5 g (8.8 m moles) of silicon tetrachloride and 1.6 g (35.2 m moles) of ethyl alcohol and the reaction was carried out at 80° C. for 1 hour. Thereafter, 5 ml (45 m moles) of titanium tetrachloride were added thereto and the reaction was continued at 98° C. for additional 3 hours. After completion of the reaction, the reaction mixture was cooled and kept standing and the supernatant liquid was discarded by decantation followed by three times of washing of the solid by the addition of 100 ml of fresh n-heptane, agitation and standing of the mixture and discarding of the supernatant liquid and finally a dispersion was obtained by the addition of 200 ml of n-heptane to the solid catalyst. The content of titanium supported on the solid was determined colorimetrically to give a result of 42 mg Ti/g carrier.

(2) Preparation of a composition of the copolymer of ethylene

Into a stainless steel-made autoclave of 2 liter capacity were introduced, after replacement of the air inside with dry nitrogen, 500 ml of dehydrated hexane, 0.08 m mole of the solid catalyst prepared as described in (1) above containing 0.16 m mole/liter of titanium, 0.21 m mole of triethyl aluminum and 0.59 m mole of diethyl aluminum chloride.

In the next place, the autoclave was continuously fed with hydrogen at a rate calculated to give the resultant polymer of ethylene an intrinsic viscosity $[\eta]$ shown in Table 3 and ethylene at a rate to give a total pressure inside the vessel of 8.7 kg/cm$^2$G and the reaction was performed with agitation for 25 minutes at a predetermined temperature shown in Table 3.

In the second step to follow, the reaction vessel was cooled to 40° C. and further fed with ethylene, propylene and hydrogen in such a calculated volume that an intrinsic viscosity $[\eta]$ shown in Table 3 could be obtained and the reaction was performed under a total pressure of 8.3 kg/cm$^2$G for 120 minutes with agitation at a predetermined temperature indicated in Table 3.

In the third step, dehydrated hexane was introduced in an additional volume of 500 ml and the reaction was performed with agitation for 30 minutes at a predetermined temperature indicated in Table 3 under a total pressure of 6 kg/cm$^2$ with supply of ethylene, propylene and butene-1 as well as hydrogen in a volume calculated to give an intrinsic viscosity shown in Table 1.

After completion of the reaction, the copolymeric composition of ethylene thus obtained was washed and dried and then subjected to the measurements of the physical properties to give the results shown in Tables 3 and 4.

EXAMPLE 11

(1) Preparation of the catalyst

A reaction mixture was prepared by adding 5.05 g (38 m moles) of aluminum chloride and 10 g (88 m moles) of magnesium diethoxide into 50 ml of ethyl alcohol. Heat evolution took place by this admixing and refluxing of the ethyl alcohol started. After the reaction performed for 60 minutes under reflux, ethyl alcohol was removed by distillation and the residue was subjected to vacuum-drying at 120° C. for 6 hours and the thus obtained solid material pulverized in a ballmill at room temperature for 60 minutes. A 1 g portion of this powder was suspended in 30 ml of n-heptane and 3 ml of titanium tetrachloride were added to the suspension and reacted at 100° C. for 3 hours. After completion of the reaction, washing of the solid material was repeated three times each with 50 ml of n-heptane followed by the addition of 200 ml of n-heptane to form a suspension of the solid catalyst. The content of titanium in this catalyst was 50 mg Ti/g carrier.

(2) Preparation of the copolymeric composition of ethylene

The procedure was substantially the same as that described in (2) of Examples 6 to 10 excepting the use of the catalyst obtained in (1) above. The results are shown in Tables 3 and 4.

EXAMPLE 12

(1) Preparation of the catalyst

A reaction mixture was prepared by dispersing 10.0 g (88 m moles) of magnesium diethoxide in 150 ml of n-heptane and further adding 1.09 g (11 m moles) of silicon tetrachloride and 1.32 g (22 m moles) of isopropyl alcohol thereto at room temperature and the reaction was performed for 2 hours by heating the mixture at 80° C. Thereafter, 25 ml of titanium tetrachloride were added to the dispersion and the reaction was continued at about 100° C. for additional three hours. After cooling, washing was repeated with n-heptane until no free chlorine ions could be detected followed by final addition of 2 liters of n-heptane to form a suspension of the catalyst component (A). The content of titanium in the solid material of this suspension was 78 mg Ti/g carrier.

(2) Preparation of the copolymeric composition of ethylene

The procedure was substantially the same as that described in (2) of Examples 6 to 10 excepting the use of the catalyst obtained in (1) described above. The results are shown in Tables 3 and 4.

TABLE 1

|  | Homopolymer of ethylene | | | | Copolymer of ethylene | | | [η] (dl/g) | Density (g/cm³) |
|---|---|---|---|---|---|---|---|---|---|
|  | [η]₁ | % by wt. | [η]₂ | % by wt. | Comonomer | [η] | % by wt. | | |
| Example 1 | 20.0 | 10 | 0.3 | 50 | Propylene | 4.5 | 40 | 3.93 | 0.954 |
| Example 2 | 18.1 | 10 | 0.4 | 50 | Propylene | 3.5 | 40 | 3.33 | 0.959 |
| Example 3 | 14.1 | 14 | 0.65 | 48 | Propylene | 4.51 | 38 | 3.86 | 0.954 |
| Example 4 | 19.3 | 10 | 1.3 | 50 | Butene-1 | 4.0 | 40 | 4.10 | 0.942 |
| Comparative Example 1 | 6.2 | 10 | 0.6 | 50 | Propylene | 2.45 | 40 | 1.90 | 0.955 |
| Comparative Example 2 | 19.5 | 10 | 0.8 | 50 | Propylene | 7.88 | 40 | 5.51 | 0.949 |
| Comparative Example 3 | 20.1 | 10 | 0.9 | 50 | Propylene | 3.60 | 40 | 3.90 | 0.935 |
| Comparative Example 4 | — | — | 0.9 | 50 | Propylene | 5.94 | 50 | 3.43 | 0.952 |
| Comparative Example 5 | — | — | 1.05 | 50 | Propylene | 6.79 | 50 | 3.92 | 0.948 |
| Comparative Example 6 | 20.7 | 10 | 0.6 | 50 | Propylene | 4.04 | 40 | 3.93 | 0.952 |
| Example 5 | 17.4 | 10 | 1.09 | 50 | Propylene | 2.04 | 40 | 2.87 | 0.953 |
| Comparative Example 7 | — | — | 0.85 | 50 | Propylene | 4.73 | 50 | 2.79 | 0.9555 |

|  | Swelling ratio | Ratio of swelling ratio | log MI | $\frac{0.81-}{0.69\,[\eta]}$ | log MT | $\frac{1-0.33}{\log\,MI}$ |
|---|---|---|---|---|---|---|
| Example 1 | 1.42 | 1.06 | −1.68 | −1.90 | 1.62 | 1.55 |
| Example 2 | 1.46 | 1.10 | −1.21 | −1.49 | 1.51 | 1.40 |
| Example 3 | 1.44 | 1.08 | −1.65 | −1.85 | 1.58 | 1.54 |
| Example 4 | 1.41 | 1.09 | −1.70 | −2.02 | 1.66 | 1.56 |
| Comparative Example 1 | 1.10 | 1.14 | 0.36 | 0.50 | 0.60 | 0.88 |
| Comparative Example 2 | — | — | −2.52 | −2.99 | — | 1.83 |
| Comparative Example 3 | 1.43 | 1.06 | −1.61 | −1.88 | 1.61 | 1.54 |
| Comparative Example 4 | 1.23 | 1.06 | −1.60 | −1.56 | 1.38 | 1.53 |
| Comparative Example 5 | 1.19 | 1.07 | −1.92 | −1.89 | 1.48 | 1.63 |
| Comparative Example 6 | 1.29 | 1.22 | −1.62 | −1.90 | 1.46 | 1.53 |
| Example 5 | 1.60 | 1.13 | −0.70 | −1.17 | 1.38 | 1.23 |
| Comparative Example 7 | 1.36 | 1.04 | −0.60 | −1.12 | 1.18 | 1.20 |

[η]: measured at 135° C. in decahydronaphthalene
Swelling ratio: capillary rheometer; orifice D = 0.06 inch and L = 2 inches; temperature 190° C.; shearing velocity 10.3 sec⁻¹; spontaneous cooling of 5 cm strand; calculated as the ratio of (diameter of test piece)/(diameter of nozzle)

Ratio of swelling ratio: $\frac{\text{(swelling ratio at shearing velocity 103 sec}^{-1}\text{)}}{\text{(swelling ratio at shearing velocity 10.3 sec}^{-1}\text{)}}$ MI: measured according to ASTM D 1238
MT: melt tension; melt tension tester manufactured by Toyo Seiki Co.; orifice D = 2.10 mm and L = 8.00 mm; temperature 190° C.; plunger descending at 15 mm/minute; take-up velocity of strand 10 r.p.m.

TABLE 2

|  | Time to parison break (seconds) | Ratio of parison diameter | Olsen stiffness (Kg/cm) | Rate of extrusion (g/min) | Resin pressure (Kg/cm² G) | Blow-mold-ability | Babble Stability |
|---|---|---|---|---|---|---|---|
| Example 1 | 110 | 1.03 | 10500 | 38 | 80 | Good | Good |
| Example 2 | 40 | 1.06 | 9400 | 39 | 70 | Good | Good |
| Example 3 | 105 | 1.04 | 10600 | 37 | 86 | Good | Good |
| Example 4 | 123 | 1.05 | 8100 | 37 | 84 | Good | Good |
| Comparative Example 1 | Not moldable | | 10900 | 30 | 50 | Poor | Not moldable |
| Comparative Example 2 | Not moldable | | 9500 | — | — | Poor | Not moldable |
| Comparative Example 3 | 105 | 1.06 | 6100 | 35 | 91 | Good | Good |
| Comparative Example 4 | 53 | 1.03 | 10200 | 34 | 112 | Good | Poor |
| Comparative | 72 | 1.04 | 9300 | 29 | 129 | Good | Poor |

TABLE 2-continued

| | Time to parison break (seconds) | Ratio of parison diameter | Olsen stiffness (Kg/cm) | Rate of extrusion (g/min) | Resin pressure (Kg/cm² G) | Blow-moldability | Babble Stability |
|---|---|---|---|---|---|---|---|
| Example 5 | | | | | | | |
| Comparative Example 6 | 57 | 1.25 | 10200 | 37 | 87 | Good | Slightly swaying |
| Example 5 | 15 | 1.08 | 10500 | 40 | 54 | Good | Good |
| Comparative Example 7 | 5 | 1.03 | 10900 | 39 | 65 | Good | Poor |

Time to parison break: time to the break of 40 g parison at 215° C.; die diameter 10 mm; core diameter 9 mm
Ratio of parison diameter: (parison diameter at extrusion velocity 60 r.p.m.)/(parison diameter at extrusion velocity 20 r.p.m.)
Olsen stiffness: measured according to ASTM D 747
Amount of extrusion: extruded amount per minute at screw rotation 60 r.p.m. using 20 mm diameter inflation molding machine
Resin pressure: pressure of resin under the same conditions as above
Bubble stability: stability of bubbles by inflation molding at extrusion rate of 22 g/minute using 20 mm diameter inflation molding machine
Blow moldability: possibility or impossibility of blow molding of bottles using 25 mm diameter blow molding machine

TABLE 3

| | First step | | | Second step** | | | | Third step** | | |
|---|---|---|---|---|---|---|---|---|---|---|
| | Temperature (°C.) | Intrinsic viscosity $[\eta]^*$ (dl/g) | Amount polymerized (% by wt.) | Temperature (°C.) | Other α-olefin Kind | Content (% by wt.) | Intrinsic viscosity $[\eta]^*$ (dl/g) | Temperature (°C.) | Other α-olefin Kind | Content (% by wt.) |
| Example 6 | 70 | 20.1 | 10.0 | 90 | — | — | 0.32 | 80 | Propylene | 16.8 |
| Example 7 | 70 | 17.8 | 10.0 | 90 | — | — | 0.38 | 80 | Propylene | 16.8 |
| Example 8 | 70 | 19.4 | 10.0 | 90 | — | — | 1.31 | 80 | Butene-1 | 17.8 |
| Example 9 | 70 | 14.1 | 14.3 | 90 | — | — | 0.41 | 80 | Propylene | 17.2 |
| Example 10 | 70 | 13.8 | 17.0 | 90 | — | — | 0.65 | 80 | Propylene | 17.9 |
| Example 11 | 70 | 19.1 | 10.0 | 90 | — | — | 1.05 | 80 | Propylene | 16.3 |
| Example 12 | 70 | 18.1 | 10.0 | 80 | Propylene | 16.3 | 3.5 | 90 | — | — |
| Comparative Example 8 | 90 | 0.6 | 50.0 | 80 | Propylene | 16.8 | 4.04 | 50 | — | — |
| Comparative Example 9 | 70 | 10.5 | 14.3 | 90 | — | — | 0.85 | 80 | Propylene | 17.3 |
| Comparative Example 10 | 70 | 28.0 | 4.3 | 90 | — | — | 1.1 | 80 | Propylene | 15.8 |
| Comparative Example 11 | 70 | 15.1 | 25.0 | 90 | — | — | 1.1 | 80 | Propylene | 22.5 |
| Comparative Example 12 | 70 | 19.3 | 10.0 | 90 | Propylene | 5.4 | 1.05 | 80 | Propylene | 8.8 |
| Comparative Example 13 | 70 | 18.5 | 10.0 | 90 | — | — | 0.2 | 80 | Propylene | 17.8 |
| Comparative Example 14 | 70 | 18.7 | 10.0 | 90 | — | — | 1.7 | 80 | Propylene | 16.8 |
| Comparative Example 15 | 70 | 18.4 | 10.0 | 90 | — | — | 0.93 | 80 | Propylene | 1.8 |
| Comparative Example 16 | 70 | 19.2 | 10.0 | 90 | — | — | 1.12 | 80 | Propylene | 45.0 |
| Comparative Example 17 | 70 | 18.5 | 10.0 | 90 | — | — | 0.91 | 80 | Propylene | 18.0 |

| | Third step** | (c)/(b) | Final polymer | | | | | | | |
|---|---|---|---|---|---|---|---|---|---|---|
| | Intrinsic viscosity $[\eta]^*$ (dl/g) | ratio of polymerized amounts | Density (g/cm³) | Intrinsic viscosity $[\eta]^*$ (dl/g) | Swelling ratio | Ratio of swelling ratio | log MI | 0.81–0.69 [η] | log MT | 1–0.33 log MI |
| Example 6 | 4.41 | 0.8 | 0.954 | 3.93 | 1.42 | 1.06 | −1.68 | −1.90 | 1.62 | 1.55 |
| Example 7 | 3.46 | 0.8 | 0.949 | 3.33 | 1.46 | 1.10 | −1.21 | −1.49 | 1.51 | 1.40 |
| Example 8 | 3.96 | 0.8 | 0.942 | 4.10 | 1.44 | 1.09 | −1.70 | −2.02 | 1.66 | 1.56 |
| Example 9 | 4.39 | 0.8 | 0.954 | 3.86 | 1.44 | 1.07 | −1.57 | −1.85 | 1.58 | 1.51 |
| Example 10 | 4.51 | 0.7 | 0.948 | 4.20 | 1.42 | 1.09 | −1.80 | −2.09 | 1.64 | 1.59 |
| Example 11 | 3.99 | 0.8 | 0.951 | 4.03 | 1.44 | 1.05 | −1.66 | −1.97 | 1.65 | 1.55 |
| Example 12 | 1.27 | 0.8 | 0.952 | 3.70 | 1.46 | 1.08 | −1.74 | −1.74 | 1.59 | 1.57 |
| Comparative Example 8 | 20.7 | 0.25 | 0.952 | 3.93 | 1.29 | 1.22 | −1.62 | −1.90 | 1.46 | 1.53 |
| Comparative Example 9 | 5.29 | 0.3 | 0.951 | 3.92 | 1.28 | 1.10 | −1.77 | −1.89 | 1.45 | 1.58 |
| Comparative Example 10 | 4.57 | 0.3 | 0.950 | 3.72 | 1.38 | 1.13 | −1.68 | −1.76 | 1.56 | 1.55 |
| Comparative Example 11 | 3.1 | 0.3 | 0.941 | 6.49 | not measurable | not measurable | not measurable | −3.67 | not measurable | not measurable |
| Comparative Example 12 | 3.26 | 0.3 | 0.951 | 3.76 | 1.46 | 1.07 | −1.68 | −1.77 | 1.58 | 1.55 |
| Comparative Example 13 | 4.78 | 0.3 | 0.949 | 3.86 | 1.42 | 1.08 | −1.66 | −1.85 | 1.58 | 1.55 |
| Comparative Example 14 | 2.81 | 0.3 | 0.950 | 3.84 | 1.43 | 1.14 | −1.86 | −1.84 | 1.57 | 1.61 |
| Comparative | 3.94 | 0.3 | 0.964 | 3.88 | 1.42 | 1.08 | −1.66 | −1.87 | 1.60 | 1.55 |

TABLE 3-continued

| | | | | | | | | | | |
|---|---|---|---|---|---|---|---|---|---|---|
| Example 15 Comparative Example 16 | 2.6 | 0.3 | 0.937 | 3.52 | 1.47 | 1.10 | −1.60 | −1.62 | 1.53 | 1.53 |
| Comparative Example 17 | 7.99 | 0.3 | 0.949 | 5.5 | not measurable | not measurable | −2.52 | −2.99 | not measurable | 1.83 |

*Measurement was performed at 135° C. in decahydronaphthalene.
**In Examples 6 to 11, the steps (b) and (c) were undertaken as the second and third steps, respectively. In Example 12, the order of the step (b) and the step (c) was reversed.

TABLE 4

| | Olsen*¹ stiffness (Kg/cm) | Melt tension (g)*² | Swelling ratio*³ | ESCR*⁴ (hr) | Soluble*⁵ fraction (%) | Appearance of shaped article | Remarks |
|---|---|---|---|---|---|---|---|
| Example 6 | 10500 | 42 | 1.42 | 400 | 4 | Good | — |
| Example 7 | 9700 | 32 | 1.46 | 300 | 4 | Good | — |
| Example 8 | 8400 | 46 | 1.44 | 1000< | 3 | Good | — |
| Example 9 | 10600 | 38 | 1.44 | 500 | 4 | Good . | — |
| Example 10 | 10100 | 36 | 1.42 | 300 | 3 | Good | — |
| Example 11 | 10200 | 43 | 1.44 | 600 | 3 | — | — |
| Example 12 | 10300 | 39 | 1.46 | 350 | 2 | — | — |
| Comparative Example 8 | 10200 | 29 | 1.29 | 400 | 4 | — | — |
| Comparative Example 9 | 10000 | 28 | 1.28 | 1000< | 3 | — | — |
| Comparative Example 10 | 9800 | 36 | 1.38 | 450 | 3 | lumps, sharkskin | poor extraction of polymer after 36 hours |
| Comparative Example 11 | 8500 | not measurable | not measurable | 1000< | 2 | not moldable | — |
| Comparative Example 12 | 10100 | 38 | 1.46 | 200 | 15 | — | — |
| Comparative Example 13 | 9700 | 38 | 1.42 | 650 | 10 | — | — |
| Comparative Example 14 | 9900 | 39 | 1.43 | 25 | 2 | lumps | — |
| Comparative Example 15 | 13200 | 40 | 1.42 | 50 | 3 | — | — |
| Comparative Example 16 | 6500 | 34 | 1.47 | 1000< | 3 | lumps | — |
| Comparative Example 17 | 9500 | not measurable | not measurable | 1000< | 3 | — | — |

*¹measured according to ASTM D 747
*²melt tension tester manufactured by Toyo Seiki Co.; orifice D = 2.10 mm and L = 8.00 mm; temperature 190° C.; plunger descending at 15 mm/minute; take-up velocity of strand 10 r.p.m.
*³capillary rheometer; orifice D = 0.06 inch and L = 2 inches; temperature 190° C.; shearing velocity 10.3 sec⁻¹; spontaneous air cooling of 5 cm strand; calculated as the ratio of (diameter of test piece)/(diameter of nozzle)
*⁴3 mm; measured by Bell method using 10% aqueous solution of Nissan Nonion
*⁵extraction of 10 g sample with 100 ml of hexane in a Soxhlet extractor

What is claimed is:

1. A composition of polymers of ethylene comprising
(a) from 15 to 90% by weight of a homopolymer of ethylene comprising a combination of a first polyethylene having an intrinsic viscosity in the range from 11 to 26 dl/g and a second polyethylene having an intrinisic viscosity in the range 0.2 to 1.6 dl/g in a weight ratio in the range from 1:1 to 1:10, and
(b) from 85 to 10% by weight of a copolymer of ethylene and an α-olefin having from 3 to 10 carbon atoms in a molecule,
said resin composition having an intrinsic viscosity in the range from 2.0 to 5.2 dl/g, a density in the range from 0.938 to 0.970 g/cm³ and a swelling ratio of at least 1.30 and satisfying the relationships expressed by the equations $\log MI \geq 0.81 - 0.69 [\eta]$ and $\log MT \geq 1 - 0.33 \log MI$, in which MI is a melt index, $[\eta]$ is an intrinsic viscosity and MT is a melt tension.

2. The composition as claimed in claim 1 wherein in said homopolymer, said first polyethylene has an intrinisic viscosity in the range from 12 to 25 dl/g and said second polyethylene has an intrinsic viscosity in the range of from 0.2 to 1.5 dl/g.

3. The composition as claimed in claim 1 wherein there is present (a) from 40 to 70% by weight of said homopolymer and (b) from 60 to 30% by weight of said copolymer.

4. The compositions as claim 2 wherein the weight ratio of said first polyethylene to said second polyethylene is from 1:2 to 1:7.

5. The composition as claimed in claim 1 wherein said resin composition has an intrinsic viscosity from 2.2 to 4.5 dl/g, a density from 0.940 to 0.960, a swelling ratio of at least 1.35.

* * * * *